US006977598B2

(12) United States Patent
Longbottom (10) Patent No.: US 6,977,598 B2
(45) Date of Patent: Dec. 20, 2005

(54) AIRCRAFT PROTECTION SYSTEM AND METHOD

(75) Inventor: Jeffrey A. Longbottom, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 89 days.

(21) Appl. No.: 10/651,504

(22) Filed: Aug. 29, 2003

(65) Prior Publication Data

US 2004/0174290 A1 Sep. 9, 2004

Related U.S. Application Data

(60) Provisional application No. 60/452,716, filed on Mar. 7, 2003.

(51) Int. Cl.$^7$ ............................................. G08B 21/00
(52) U.S. Cl. ........................... 340/945; 342/36; 342/67
(58) Field of Search .................... 340/945; 89/1.11; 342/36, 67

(56) References Cited

U.S. PATENT DOCUMENTS

| | | | |
|---|---|---|---|
| 4,516,125 A * | 5/1985 | Schwab et al. ............... 342/36 |
| 5,198,607 A | 3/1993 | Livingston et al. .......... 89/1.11 |
| 5,406,289 A * | 4/1995 | Barker et al. ................. 342/96 |
| 5,747,720 A * | 5/1998 | Schnurr et al. .............. 89/1.11 |
| 6,587,486 B1 * | 7/2003 | Sepp et al. ................... 372/22 |
| 6,738,012 B1 * | 5/2004 | Kirkpatrick ................... 342/67 |
| 6,782,790 B2 * | 8/2004 | Barrett ......................... 89/1.11 |

FOREIGN PATENT DOCUMENTS

WO WO 00/20880 4/2000

OTHER PUBLICATIONS

Communication from European Patent Office dated Jun. 30, 2004 with enclosed European search report for Application No. 04 25 1226, citing the above noted references (3pages).
H.R. 580, 108th Congress (2003); (pp. 1-3), Feb. 5, 2003.
S. 311, 108th Congress (2003); (pp. 1-3), Feb. 5, 2003.
Press Release, "*Schumer and Lowey Unveil New Plan to Protect New York Airports From Wartime Stinger Missile Attack*"; (1-3 pgs.), Feb. 14, 2003.
David L. Rockwell; "*Eye on Electronics*"; www.aiaa.org/market/index.hfm?mar=62&issuetocid+206; (1-6 pgs.), Aug. 4, 2003.

* cited by examiner

*Primary Examiner*—John Tweel, Jr.
(74) *Attorney, Agent, or Firm*—Baker Botts L.L.P.

(57) ABSTRACT

According to one embodiment of the invention, a system for protecting aircraft includes a plurality of missile warning sensors and a turret mounted near the top of at least one support structure. Each missile warning sensor is operable to detect a missile and the turret is operable to emit a laser beam that is directed toward the missile to divert the missile from its intended flight pattern.

24 Claims, 7 Drawing Sheets

AIRCRAFT PROTECTION SYSTEM AND METHOD

RELATED APPLICATIONS

This application claims the benefit of Ser. No. 60/452,716, entitled "AIRCRAFT PROTECTION SYSTEM," filed provisionally on Mar. 7, 2003.

TECHNICAL FIELD OF THE INVENTION

The present invention relates generally to the field of aircraft protection and, more particularly, to a system and method that protects aircraft from ground-based missiles, such as Infrared Man Portable Air Defense Systems (MANPADS).

BACKGROUND OF THE INVENTION

Fears of attacks on aircraft, especially commercial aircraft, involving shoulder-launched missiles have increased since the terrorist attacks on American soil on Sep. 11, 2001. Shoulder-launched missiles are no doubt in the hands of some of the world's most dangerous terrorist groups, such as Al Qaeda and Hezbollah.

There are several types of shoulder-launched missiles. All are about five feet long and weigh less than forty pounds, which makes them highly mobile. The U.S.-made Stinger and Russian-made SA-7 Strela are the two most widely used types of shoulder-launched missiles by terrorists in attacks dating back to 1996. Each has a range of over three miles and uses a heat-seeking infrared (IR) guidance system to hone in on targets. In addition to their mobility and weight, these weapons are dangerous because they require very little training in order to operate.

While small aircraft are vulnerable to MANPAD attacks, larger aircraft, such as commercial airliners, are at greater risk because they present a greater IR heat source for the incoming missile. Additionally, current IR guided missile sensors have very narrow fields of view, and thus dispersed engines on a larger aircraft present several targets to the incoming missile. Large aircraft are particularly vulnerable during takeoff and landing because they are lower to the ground, and when landing, are moving at a slower velocity.

Current aircraft protection involves on-board countermeasures, such as pyrotechnic flares and on-board turret-based IR jammer systems. Flares pose a high risk of fire to the surrounding areas, and during takeoff and landing, when the aircraft is most vulnerable, they lack the airspace needed to disperse and act as a decoy for the incoming missile. On-board, turret-based IR jammer systems are very effective, since they would generally be in the field of view of the approaching target, but with each ship set cost ranging between one and two million dollars, outfitting all 6,800 commercial airliners to date would be a costly venture.

SUMMARY OF THE INVENTION

According to one embodiment of the invention, a system for protecting aircraft, including one ore more supports positioned adjacent a flight pattern of the aircraft, one or more missile warning sensors coupled to at least one of the supports, one or more turrets coupled to at least one of the supports, and a controller. Each of the one or more missile warning sensor is operable to detect a missile when launched. Each of the one or more turrets is operable to emit a laser toward the missile. And the controller is operable to control the emission of the laser beam in response to detection of the launched missile.

Embodiments of the invention provide a number of technical advantages. Embodiments of the invention may include all, some, or none of these advantages. A ground-based missile defense system according to one embodiment is significantly lower in cost (especially considering maintenance costs) than outfitting all commercial airlines with a missile defense system. Using a ground-based system also results in significantly fewer false alarms, and is safer than a pyrotechnic flare system that may be used on board an aircraft. Deployment of a ground-based system facilitates large, heavy traffic airports being outfitted first, followed by smaller, less traffic airports.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF EXAMPLE EMBODIMENTS OF THE INVENTION

Example embodiments of the present invention and their advantages are best understood by referring now to FIGS. 1A through 6B of the drawings, in which like numerals refer to like parts.

Figure 1A:
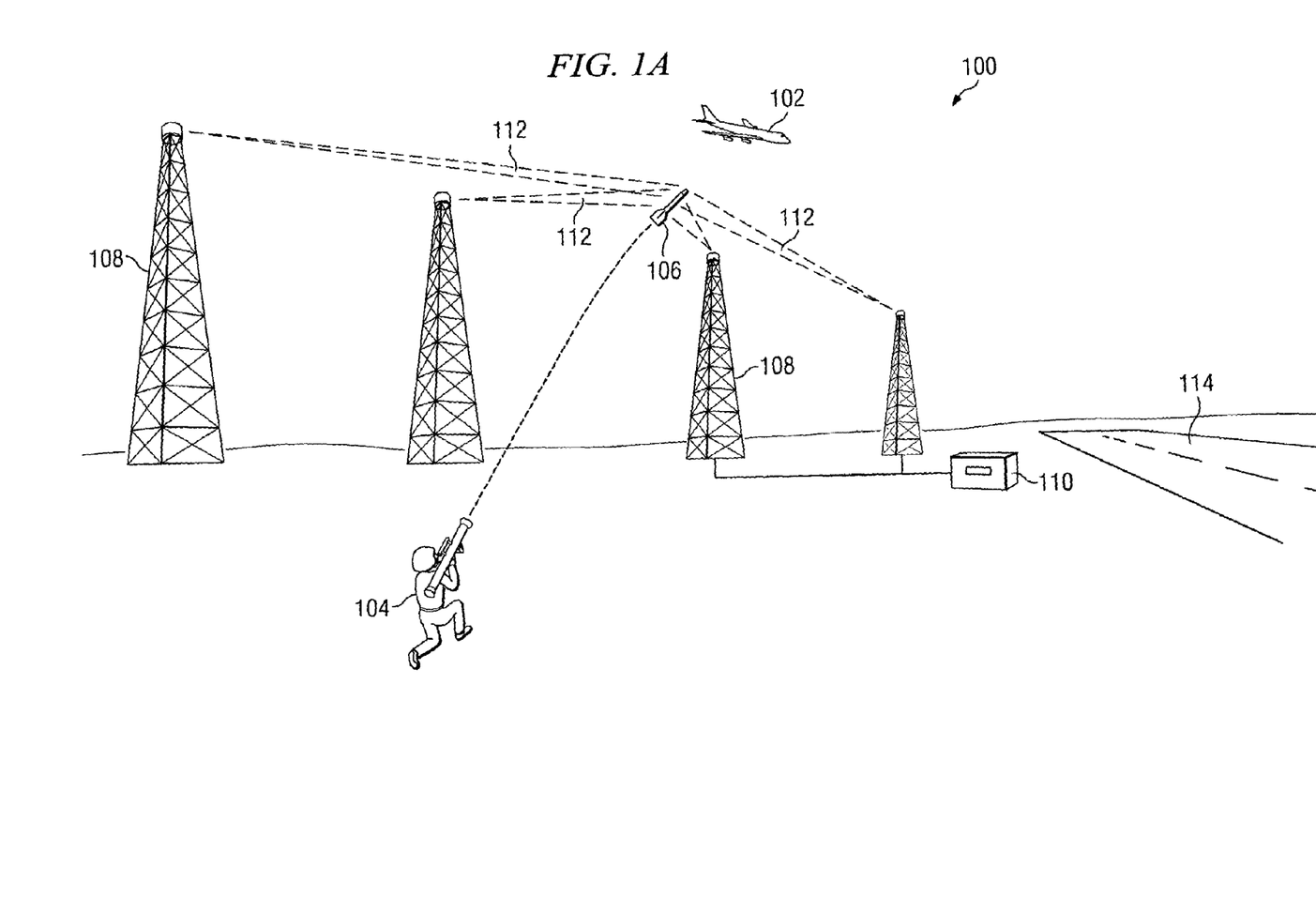
FIGS. 1A and 1B are elevation and plan views, respectively, illustrating a system for protecting aircraft from missiles in accordance to one embodiment of the invention.
Figure 1B:
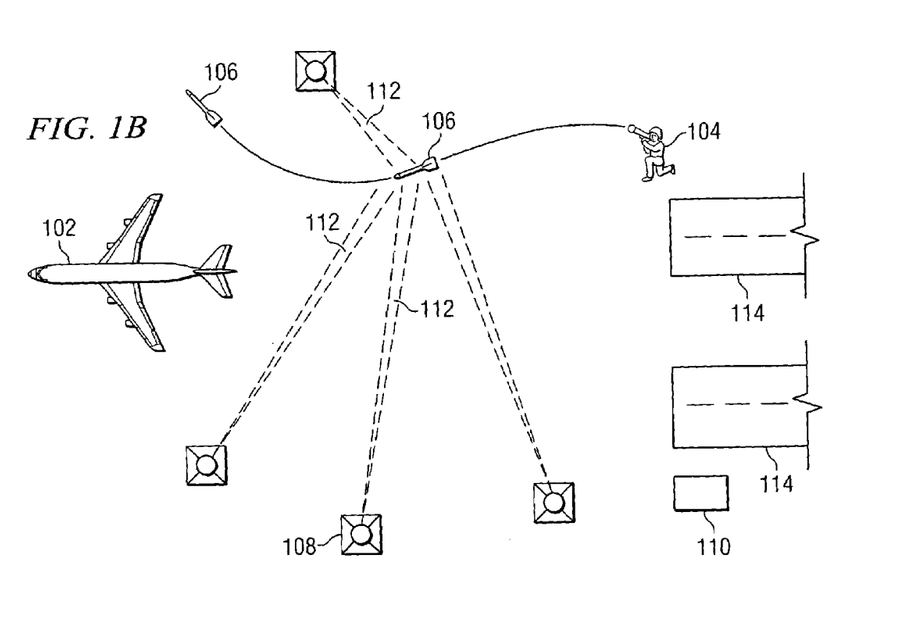

FIGS. 1A and 1B are elevation and plan views, respectively, of a system 100 for protecting aircraft from a shoulder-launched missile attack, according to one embodiment of the present invention. FIGS. 1A and 1B illustrate an aircraft 102 near an aircraft runway 114 and a terrorist 104, which may be any suitable bad person, using an Infrared Man Portable Air Defense System ("MANPAD") to shoot a missile 106 towards aircraft 102. Examples of MANPADs are the U.S.-made Stinger and Russian-made SA-7 Strela. The present invention contemplates any suitable device to launch missile 106. Although aircraft 102 is illustrated in FIGS. 1A and 1B as a commercial airliner, the present invention contemplates aircraft 102 being any suitable flying object, such as a military aircraft or helicopter, corporate jet, commuter aircraft, or freight hauling aircraft.

In the illustrated embodiment, system 100 includes a plurality of support structures 108 positioned adjacent a flight pattern of aircraft 102 and an integrated controller 110. The flight pattern of aircraft 102 can be an aircraft landing or takeoff. As described in further detailed below in conjunction with FIG. 3, one or more missile warning sensors 302 and/or one or more turrets 304 are coupled to structures 108 in accordance with an embodiment of the invention. Missile warning sensors 302 and turrets 304 work in conjunction with one another to detect the launch of missile 106 toward aircraft 102 and emit a laser 112 toward missile 106 to divert it from its intended path. Controller 110, which may be any suitable device that executes logic, is operable to synchronize laser beams 112 emitted by respective turrets 304 to maximize their effectiveness in diverting missile 106 from its intended path, or destroying the missile in flight, thereby assuring that aircraft 102 lands or takes off safely. The diversion of missile 106 is illustrated in FIG. 1B. Communication of missile warning sensors 302, turrets 304, and/or controller 110 between each other may be accomplished through any suitable link, such as a wireless link or ground lines, through the use of any suitable interface protocol.

Support structures 108 may be any suitable support structures. In the illustrated embodiment, support structures 108 are steel-framed structures that extend vertically upward. Support structures 108 may be any suitable height and may be spaced apart with any suitable spacing. In addition, the number of support structures 108 in addition to the arrangement of support structures 108 are all variable depending upon the geographic location of runway 114, number of runways, size of protection corridor, and the surrounding topography. The present invention illustrates any suitable arrangement of support structures 108 within the teachings of the present invention, from randomly positioning support structures 108, as illustrated in FIG. 1B, to strategically positioning support structures 108. The strategic positioning of support structures 108 is described in greater detail below.

Figure 2:
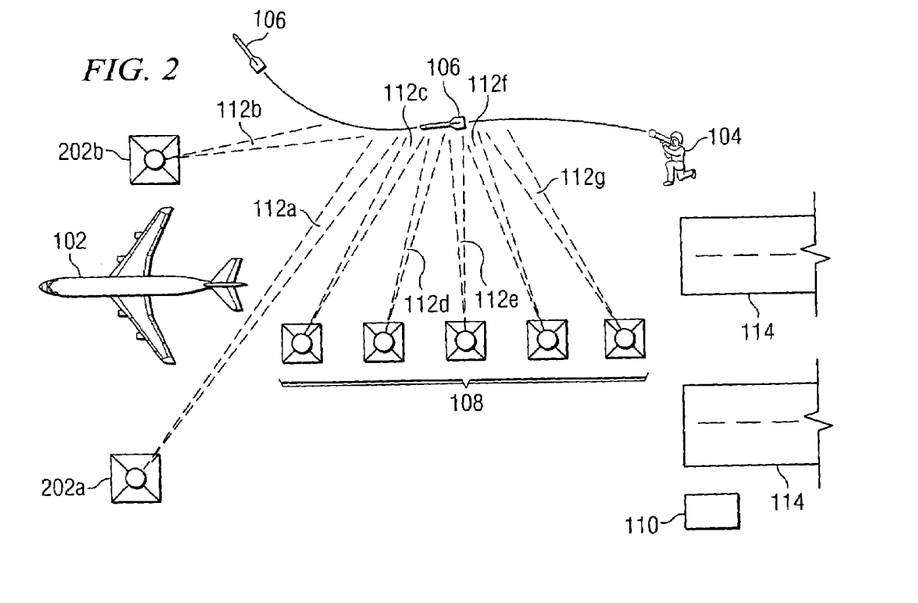
FIG. 2 is a plan view of another embodiment of the invention illustrating an example placement of supports and the use of extra tall towers.

FIG. 2 is a plan view of system 100 (FIG. 1A), according to another embodiment of the invention, illustrating some support structures 108 aligned in a straight line with one another, in addition to the use of extra tall support structures 202 to potentially increase the effectiveness of system 100. Some missiles 106 have a very long range (4 kilometers) and can reach elevations in excess of ten thousand feet. Therefore, extra tall support structures, such as support structures 202 may be utilized. In one embodiment, support structures 202 reach an elevation of a thousand feet or more, which is similar to radio towers now in existence.

Figure 3:
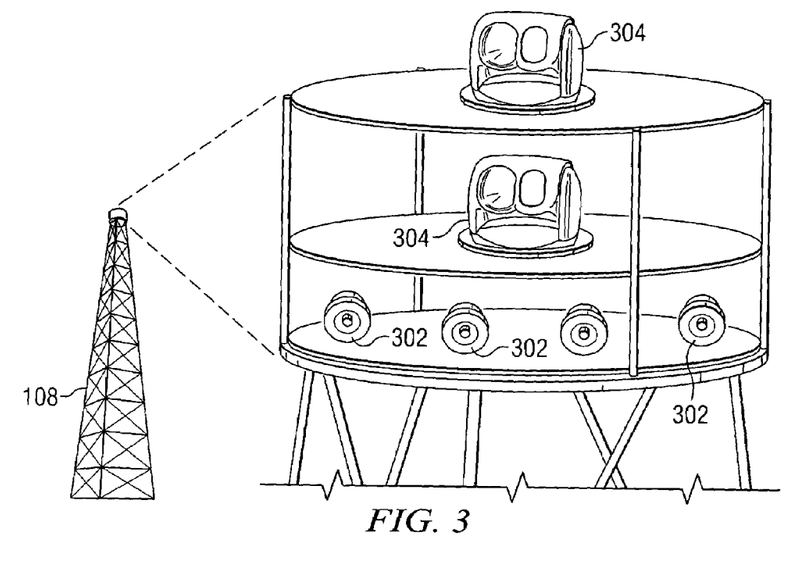
FIG. 3 is a schematic of the top of a support structure illustrating a plurality of missile warning sensors and a plurality of turrets according to an embodiment of the invention.

FIG. 3 is a schematic of a top portion of an example support structure 108 illustrating a plurality of missile warning sensors 302 and a plurality of turrets 304 mounted near the top of support structure 108 in accordance with an embodiment of the present invention. Although the embodiment depicted in FIG. 3 illustrates a plurality of missile warning sensors 302 and turrets 304, the present invention contemplates any suitable number of missile warning sensors or turrets coupled to support structure 108. In some embodiments, either missile warning sensors 302 or turrets 304 are coupled to support structure 108, but not both. Missile warning sensors 302 and turrets 304 may be positioned at or near the top, or at any other suitable location of support structure 108, and may be coupled in any suitable manner. Referring back to FIGS. 1A and 1B, generally, missile warning sensors 302 function to sense missile 106 being launched by terrorist 104 towards aircraft 102 and turrets 304 function to emit a laser beam 112 towards missile 106, in order to divert, disrupt, or distract missile 106 from its intended path, so it does not strike and destroy aircraft 102. This process is described in greater detail below.

Missile warning sensors 302 are well known in the industry and, accordingly, any suitable missile warning sensors may be utilized. Generally, missile warning sensors 302, depending on the type of missile warning sensor utilized, looks in its respective band, such as an ultraviolet band or an IR band, and looks for an increase in either ultraviolet or IR power (energy). This increase in energy indicates an ignition source. Missile warning sensors 302 then send a signal to turrets 304 regarding the incoming missile 106 (FIGS. 1A–1B) so that turret 304 may perform its function. Typically, missile warning sensors 302 are disposed around the perimeter around the top of support structure 108 and angled in a manner that provides sufficient coverage to sense missile 106 being launched. However, as described above, missile warning sensors 302 may be positioned at any other suitable location of support structure 108.

Turrets 304 are well known in the industry and, accordingly, any suitable turrets may be utilized. In the illustrated embodiment, turret 304 utilizes a multi-band laser function that provides protection against all probable threats. Turret 304, in one embodiment, is able to rotate 360 degrees in azimuth and up to + and −90 degrees in elevation in order to point towards missile 106. Turret 304, after receiving a signal from one or more missile warning sensors 302, emits a laser beam 112 (FIGS. 1A–1B), using the appropriate wavelength and waveform, at missile 106 (FIGS. 1A–1B) in order to divert, disrupt, or distract missile 106 from its intended path. In one embodiment, turret 304 includes an infrared fine tracker that is able to hone in on the location of missile 106 in order to emit laser 112 in the proper direction. Turret 304 may use any type of feedback system that identifies the missile, then determines the appropriate wavelength and waveform (closed-loop system) before emitting laser 112 with the determined, appropriate wavelength and waveform, or can simply emit a laser 112 that contains a multitude of wavelengths (open-loop system) and uses a generic waveform to defeat the missile.

Laser beams 112 (FIGS. 1A–1B) emitted by turrets 304 will typically have different levels of effectiveness. Laser beams not colocated with the target aircraft rely on optical scatter and reflections ("OSAR") to divert the missile, whereas laser beams that are colocated with the target aircraft may concentrate greater infrared energy towards the missile and be more effective in diverting the missile from its intended path. The farther the laser beam is off the bore sight of the missile, the more power is needed to divert it. This is one reason why it is preferred that there be multiple support structures 108 arranged in a strategic pattern and at different heights to minimize the angles between the turret position 304 and target aircraft in order to be most effective on incoming missiles.

Referring back to FIG. 2 as an example, by placing turrets 304 in specific locations on support structures 108, and positioning support structures 108 in strategic locations through the protection corridor of aircraft 102, one can optimize the effectiveness of turrets 304. Support structures 108 and turrets 304 can be expensive, and therefore obtaining the same level of effectiveness with less support structures 108 and turrets 304 is referred to as optimization. In the illustrated example embodiment, a plurality of support structures 108 are strategically positioned throughout the protection corridor of aircraft 102, in varying heights to parallel the flight path of aircraft 102 as it takes off from or lands on runway 114. Additionally, extra tall support structures 202a and 202b may be used in order to reduce the OSAR angle. Therefore, when terrorist 104 fires missile 106 at aircraft 102 as it takes off from runway 114, system 100 may be more effective in diverting missile 106 from aircraft 102 because lasers 112 are aimed at the field of view of the front of missile 106, which means that more energy is concentrated on the missile. In the illustrated embodiment, laser beams 112a–112c would be more effective than lasers 112d–112g because laser beams 112a–112c are pointed directly toward the oncoming missile 106, while lasers 112d–112g, while pointed at the front of missile 106, are not in the direct line of sight of the front of missile 106, therefore, lasers 112a–112c concentrate more energy on missile 106 than lasers 112d–112g. Determining the optimal number and placement of extra tall support structures 202, support structures 108, and turrets 304 adjacent an aircraft flight path may depend on a number of factors, such as budget, zoning, aesthetic, air traffic, number of runways, and topography issues.

In one embodiment, the lasers used in turret 304 are of sufficient power that when combined with laser beams from all other turrets 304 could either disable the missile 106 electronics or destroy missile 106.

Figure 4A:
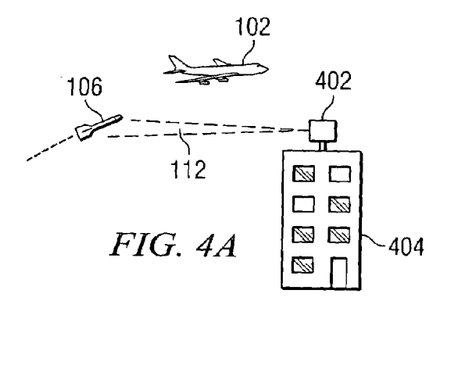
FIGS. 4A through 4G illustrate additional embodiments of the invention in which different support structures are utilized.
Figure 4B:
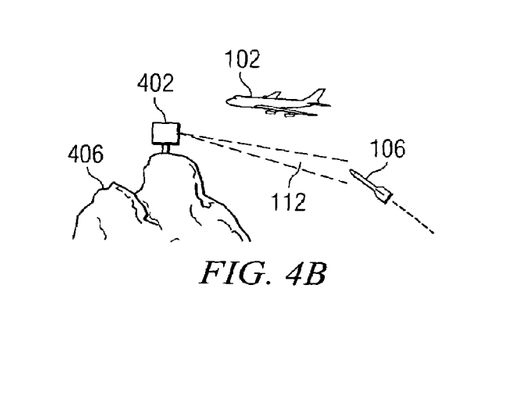
Figure 4C:
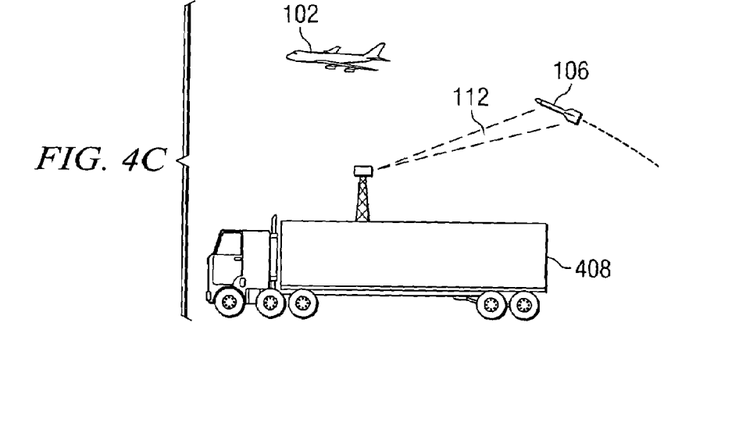
Figure 4D:
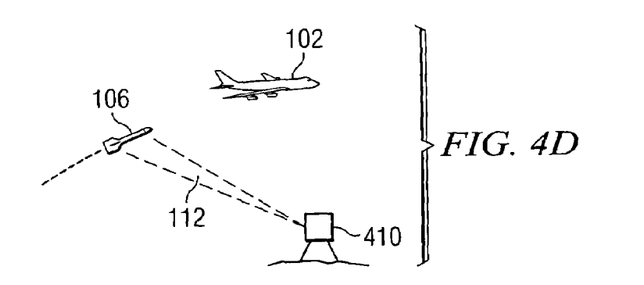
Figure 4E:
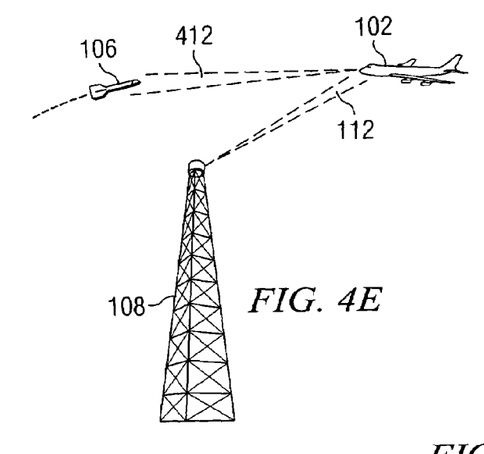
Figure 4F:
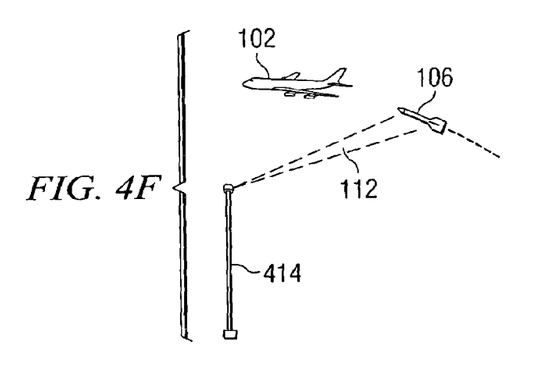
Figure 4G:
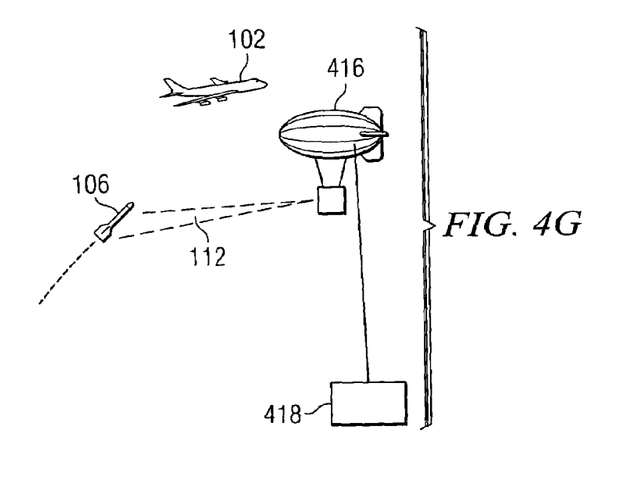

FIGS. 4A through 4G illustrate additional embodiments of the invention in which different support methods are utilized for the missile warning sensors 302 and/or turret(s) 304. These support structures may further reduce the cost of implementing a system for protecting aircraft disclosed by the present invention. As illustrated by FIG. 4A, a building 404 may be utilized to support a small structure 402 with missile warning sensors 302 and turrets 304 coupled thereto. As illustrated by FIG. 4B, the tops or sides of mountains and/or hills 406 may be used to support missile warning sensors 302 and turret 304 or a small structure 402 with missile warning sensors 302 and turrets 304. As illustrated by FIG. 4C, a mobile device 408 with or without extendable small structures 420 may be used to support missile warning sensors 302 and turrets 304. As illustrated by FIG. 4D, a low-mounted ground-based support structure 410 may be utilized to support missile warning sensors 302 and turret 304. As illustrated by FIG. 4E, targeted aircraft 102 may be used as a reflective surface. Therefore, during a missile launch the lasers 112 will point at the surface of targeted aircraft 102, which will reflect the laser energy 412 back in all directions, including at missile 106, thereby causing missile 106 to miss the intended target. As illustrated by FIG. 4F, an existing radio, television or other type of antenna tower or structure 414 may be used to support missile warning sensors 302 and turrets 304. And as illustrated by FIG. 4G, a tethered balloon 416 may be utilized to support missile warning sensors 302 and turrets 304. In this embodiment, the power and communication may come from a ground station 418. Other suitable methods of supporting and/or housing missile warning sensors 302 and turrets 304 are contemplated by the present invention.

Figure 5A:
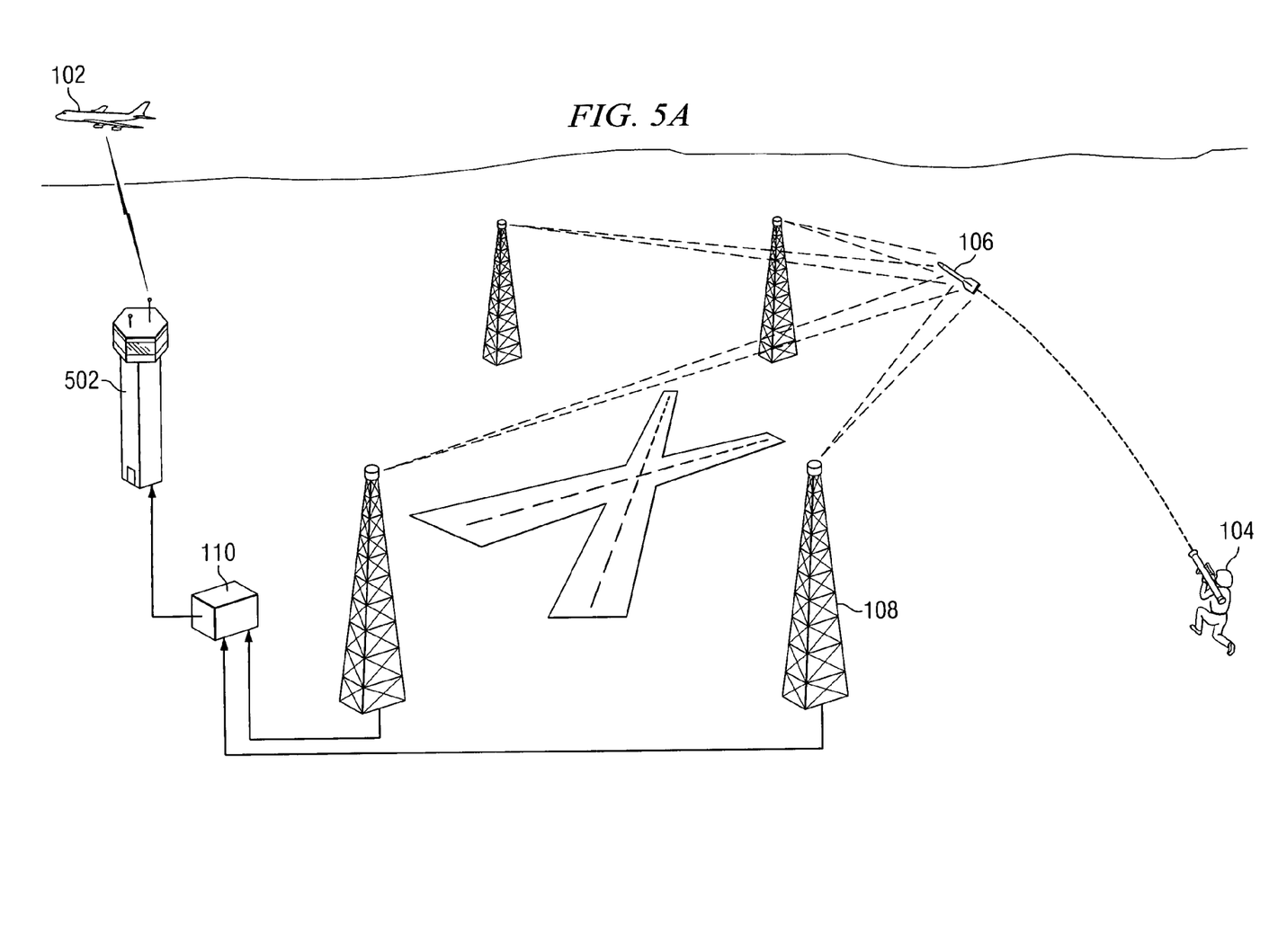
FIGS. 5A and 5B illustrate a central control unit and a missile-launch detect and alert system, respectively, in accordance with additional embodiments of the invention.

FIG. 5A illustrates an embodiment of system 100, in which the central controller 110 alerts aircraft 102 of missile 106 being launched by terrorist 104. In the illustrated embodiment, one or more missile warning sensors 302 (FIG. 3) detect missile 106 being launched by terrorist 104 and notify central controller 110 of the missile launch. Central controller 110 then directs all turrets 304 to point at the missile 106 and emit a laser beam with a jamming waveform or a destructive laser beam. In another embodiment, controller 110 relays to control tower 502 that terrorist 104 launched a missile at aircraft 106, and control tower 502 then relays this notification to aircraft 102.

Figure 5B:
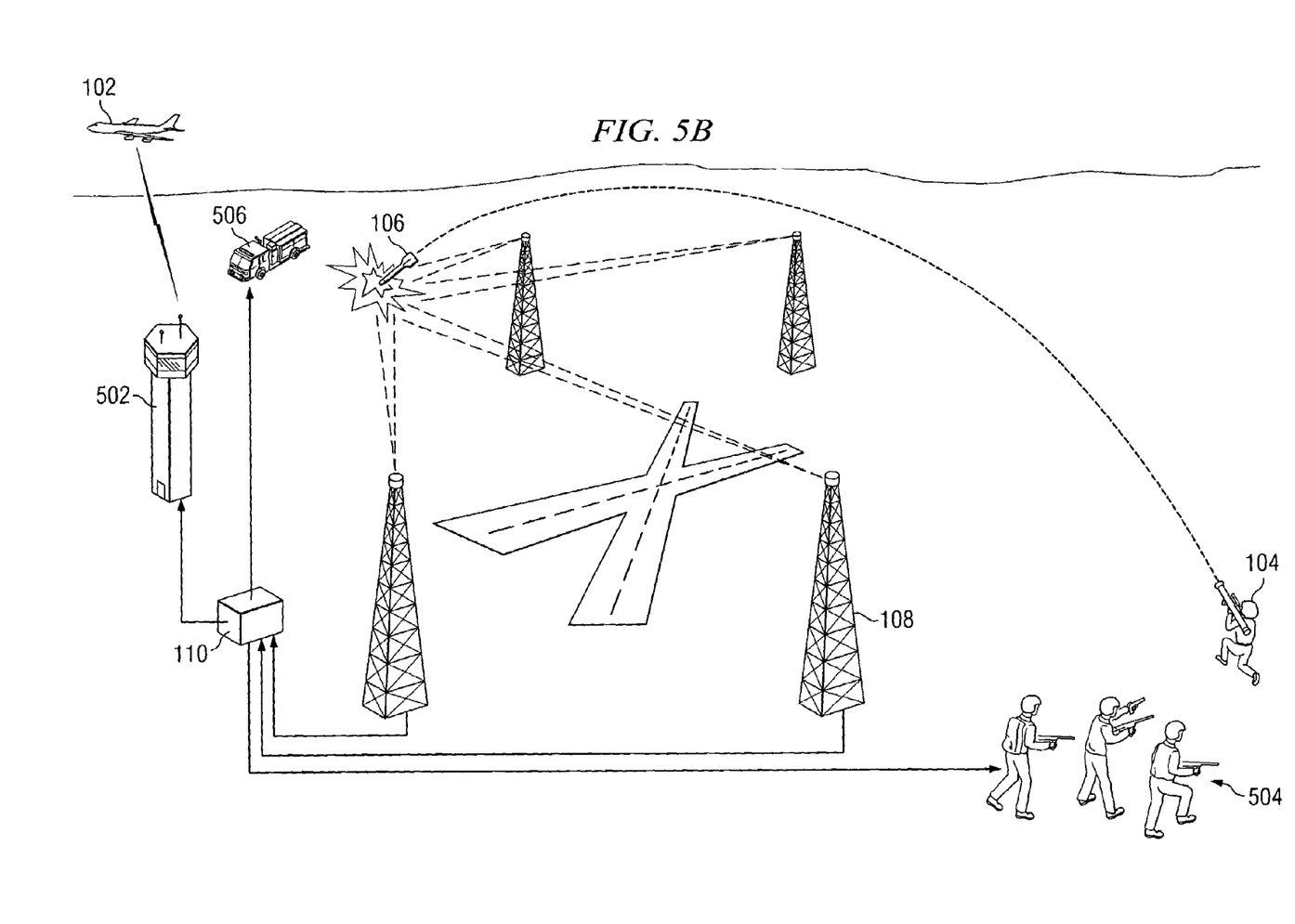

FIG. 5B illustrates an embodiment of system 100 described in conjunction with FIG. 1A, which includes a missile tracking and alert system. In the illustrated embodiment, controller 110 receives tracking data of missile 106 from missile warning sensors 302 (FIG. 3), calculates the point of origin of the launch of missile 106 (also the location where terrorist 104 launched missile 106) and calculates the point of impact of missile 106. In a particular embodiment, controller 110 triangulates missile tracking data received from turrets 304 to calculate the points of impact and origin of missile 106. Controller 110 then alerts security units 504 of the calculated point of origin of missile 106 so that security unit 504 can take any suitable action, such as investigating the calculated point of origin, as well as any suitable adjoining region, for the presence of terrorist 104. Any suitable security unit 504 may be alerted, such as one or more of the following: airport security, police, armed forces, and/or federal agencies. Controller 110 may also alert a response unit 506 of the calculated point of impact of missile 106 so that response unit 506 may take any suitable action, such as disarming the warhead if it is determined the missile did not explode, containing and/or suppressing any fires the impact missile 106 may have caused, assessing damage created by the impact of missile 106, and/or providing emergency medical services to individuals that may have suffered any injury due to missile 106 impacting the point of impact. Any suitable response unit 506 may be alerted, such as one or more of the following: fire department, medical alert, and/or bomb squad. Other suitable entities may also be notified by controller 100, such as a hospital. Upon declaration of missile 106 launch, system 100 may give specific instructions to all aircraft 102, both in the air and on the ground, to proceed to predetermined positions until the airfield and air space are secure.

Figure 6A:
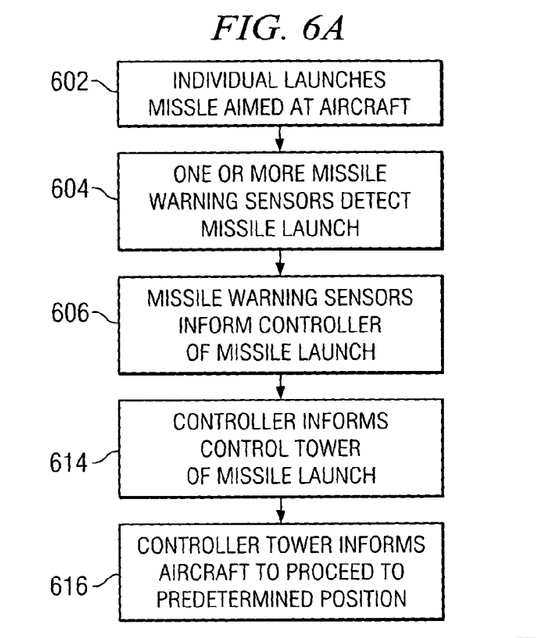
FIGS. 6A and 6B are flow diagrams illustrating an example method of alerting, and tracking, respectively, a missile launch towards an aircraft.
Figure 6B:
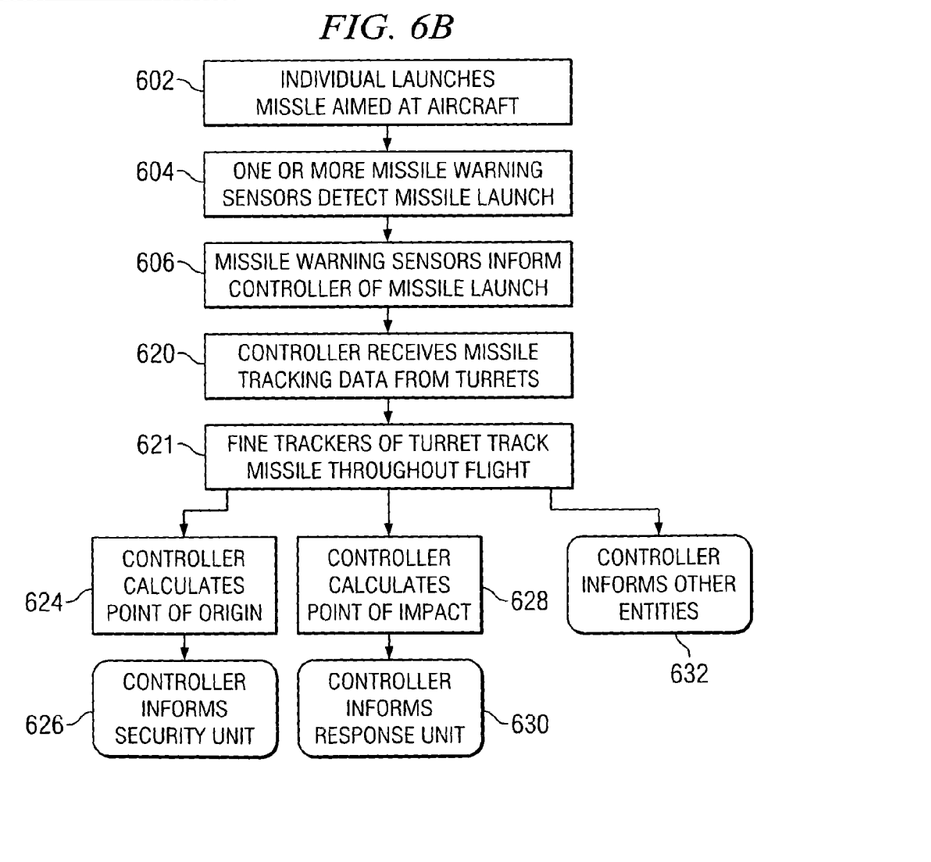

FIGS. 6A and 6B are flow diagrams illustrating an example method of alerting, and tracking, respectively, a missile launch towards an aircraft. With reference to FIGS. 1A and 1B, after terrorist 104 launches missile 106 at aircraft 102, as denoted by step 602, missile warning sensors 302 (FIG. 3) detect the launch and inform controller 110, as denoted by steps 604 and 606, respectively. At this point, controller 110 tracks missile 106, as described in further detail below.

FIG. 6A illustrates the alert aspect of the example method described above. With reference to FIGS. 1A and 1B, after missile warning sensors 302 (FIG. 3) inform controller 110 of a missile launch, the controller 110 informs control tower 502 (FIGS. 5A–5B) that a missile launch has been detected, as denoted by step 614. Control tower 502 then informs aircraft 102 to proceed to predetermined position as denoted by step 616.

FIG. 6B illustrates the tracking aspect of the example method described above. With reference to FIGS. 1A and 1B, after missile warning sensors 302 (FIG. 3) inform controller 110 of a missile launch, controller then receives missile tracking data from turrets 304 of missile 106, as denoted by step 620. Controller 110 receives missile tracking data from suitable fine trackers of turrets 304 during the entire missile flight (as denoted by step 621) and therefore calculates a point of origin and/or a point of impact of missile 106. In one embodiment, controller 110 triangulates missile tracking data received from turrets 304 to calculate the point of origin and/or point of impact of missile 106. Controller 110 then calculates the point of origin of missile 106 (or the location of terrorist 104), as denoted by step 624 and alerts security unit 504 (FIGS. 5A–5B) of the calculated point of origin of missile 106, as denoted by step 626. Controller 110 also calculates the point of impact of missile 106, using the missile tracking data, as denoted by step 628, and alerts response unit 506 (FIGS. 5A–5B) of the calculated point of impact, as denoted by step 630. Additionally, controller 110 may also alert any other suitable entity, as denoted by step 632, of any of the collected information, including the detection of a missile launch, the missile tracking data, the calculated point of impact, and/or the calculated point of origin of the missile launch. The entity may be any group, individual or controller that does not fall into either security unit 504 or response unit 506. In a particular embodiment of the present invention, the entity is a hospital.

Although embodiments of the invention and some of their advantages are described in detail, a person skilled in the art could make various alterations, additions, and omissions without departing from the spirit and scope of the present invention as defined by the appended claims.

What is claimed is:

1. A system for protecting aircraft, comprising:
   one or more supports positioned adjacent a flight pattern of an aircraft;
   one or more missile warning sensors coupled to at least one of the supports, each of the one or more missile warning sensors operable to detect a missile when launched;
   one or more turrets coupled to at least one of the supports, each of the one or more turrets operable to emit a laser beam toward the missile;
   a controller operable to control the emission of the laser beam in response to detection of the launched missile; and
   wherein the laser beam is operable to divert the missile by relying on optical scatter and reflections.

2. The system of claim 1, wherein the aircraft is selected from the group consisting of a commercial aircraft, a private aircraft, a freight aircraft, and a military aircraft.

3. The system of claim 1, wherein at least one of the supports is selected from the group consisting of: a tower, a building, a mountain, a hill, a mobile tower, a low mounted ground base, an antenna, a tethered balloon, and a tree.

4. The system of claim 1, wherein the one or more supports comprises a plurality of supports, at least one of the plurality of supports having an elevation of at least one thousand feet.

5. The system of claim 1, wherein the one or more supports comprises a plurality of supports, at least one of the plurality of supports positioned to reduce the optical scatter and reflections angle with respect to the missile.

6. The system of claim 1, wherein the flight pattern of the aircraft comprises an aircraft takeoff.

7. The system of claim 1, wherein the flight pattern of the aircraft comprises an aircraft landing.

8. The system of claim 1, wherein the one or more missile warning sensors are mounted near a top of the one or more supports.

9. The system of claim 1, wherein the one or more turrets are mounted near a top of the one or more supports.

10. The system of claim 1, wherein the one or more supports is a plurality of supports, and wherein the controller is further operable to synchronize the laser beams emitted by respective turrets to divert the missile from its flight path or destroy the missile.

11. A method for protecting aircraft, comprising:
    providing one or more supports adjacent a flight pattern of an aircraft;
    coupling one or more missile warning sensors to at least one of the supports, each of the one or more missile sensors operable to detect a missile when launched;
    coupling one or more turrets to at least one of the supports, each of the one or more turrets operable to emit a laser beam toward the missile to divert the missile from its path by relying on optical scatter and reflections.

12. The method of claim 11, wherein each of the one or more turrets is operable to emit the laser beam toward the aircraft, the method further comprising reflecting the laser beam off of a reflective surface of the aircraft to divert the missile from it path.

13. The method of claim 11, further comprising reducing the optical scatter and reflections angle with respect to the missile by employing an extra tall support structure.

14. The method of claim 11, wherein providing one or more supports adjacent the flight pattern of the aircraft further comprises providing one or more supports adjacent an aircraft takeoff.

15. The method of claim 11, wherein providing one or more supports adjacent the flight pattern of the aircraft further comprises providing one or more supports adjacent an aircraft landing.

16. The method of claim 11, wherein coupling one or more missile sensors to at least one of the supports further comprises coupling the one or more missile warning sensors near a top of at least one of the supports.

17. The method of claim 11, wherein coupling one or more turrets to at least one of the supports further comprises coupling the one or more turrets near a top of at least one of the supports.

18. A method for protecting aircraft, comprising:
    providing a plurality of supports adjacent a flight pattern of an aircraft, at least one of the supports having an elevation of at least one thousand feet;
    coupling one or more missile warning sensors to at least one of the supports, each of the one or more missile warning sensors operable to detect a missile when launched by detecting an increase in either ultraviolet or infrared energy;
    coupling a plurality of turrets to respective ones of the supports, each turret operable to emit a laser beam toward the missile;
    directing, in response to the detected missile launch, the plurality of turrets toward the missile; and
    emitting, by at least one of the turrets, a laser beam toward the missile to divert the missile from its path.

19. The method of claim 18, further comprising randomly positioning the plurality of supports adjacent the flight pattern of the aircraft.

20. The method of claim 18, further comprising strategically positioning the plurality of supports adjacent the flight pattern of the aircraft to optimize air space coverage by the one or more turrets.

21. The method of claim 18, wherein providing the plurality of supports adjacent the flight pattern of the aircraft further comprises providing the plurality of supports adjacent an aircraft takeoff.

22. The method of claim 18, wherein providing the plurality of supports adjacent the flight pattern of the aircraft further comprises providing the plurality of supports adjacent an aircraft landing.

23. The method of claim 18, wherein coupling one or more missile sensors to at least one of the supports further comprises coupling the one or more missile warning sensors near a top of at least one of the supports.

24. The method of claim 18, wherein coupling the plurality of turrets to respective ones of the supports further comprises coupling the plurality of turrets near a top of at least one of the supports.

* * * * *